United States Patent
Huang

(10) Patent No.: US 11,094,348 B2
(45) Date of Patent: Aug. 17, 2021

(54) DISC LIBRARY STORAGE SYSTEM AND DISC CARTRIDGE USED THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Cheng-Wen Huang, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 16/701,643

(22) Filed: Dec. 3, 2019

(65) Prior Publication Data
US 2020/0327907 A1    Oct. 15, 2020

(30) Foreign Application Priority Data
Apr. 9, 2019   (CN) .......................... 201910281002.5

(51) Int. Cl.
*G11B 23/03*    (2006.01)
*G11B 33/04*    (2006.01)

(52) U.S. Cl.
CPC ...... *G11B 23/0328* (2013.01); *G11B 33/0466* (2013.01)

(58) Field of Classification Search
CPC ............ G11B 23/0328; G11B 33/0466; G11B 23/0323; G11B 17/053; G11B 17/26
See application file for complete search history.

(56) References Cited

U.S. PATENT DOCUMENTS

| | | | | |
|---|---|---|---|---|
| 4,593,441 A | * | 6/1986 | St. Louis | ............... F16B 5/0614 24/295 |
| 4,800,554 A | * | 1/1989 | Yamasaki | ............... G11B 17/30 360/92.1 |
| 5,093,818 A | * | 3/1992 | Suzuki | ............... G11B 17/0404 369/30.83 |

(Continued)

FOREIGN PATENT DOCUMENTS

CN            1090423 A        8/1994

OTHER PUBLICATIONS

Communication corresponding to Chinese Application No. 201910281002.5 and issued by the China National Intellectual Property Administration dated Mar. 25, 2021, 10 pages.

*Primary Examiner* — Brian E Miller
(74) *Attorney, Agent, or Firm* — Innovation Counsel LLP

(57) ABSTRACT

A disc library storage system and a disc cartridge thereof are provided. The disc library storage system includes a disc library, a disc drive tower, a disc transport device and a disc changing device. The disc library accommodates multiple discs. The disc drive tower accommodates multiple disc drives. The disc drives read data of the discs. The disc transport device moves the discs from the disc library to the disc drive tower and to the disc library. The disc changing device places a disc cartridge including an outer casing and a disc tray. The disc tray accommodates at least one replacement disc. The disc changing device has a pull-out state, in which the disc tray is received in the outer casing, and a close state, in which the disc tray is drawn from the outer casing and the disc transport device unloads the replacement disc from the disc tray.

14 Claims, 15 Drawing Sheets

(56) References Cited

U.S. PATENT DOCUMENTS

| | | | | |
|---|---|---|---|---|
| 5,200,938 A * | 4/1993 | Akiyama | G11B 17/223 | 206/445 |
| 5,348,356 A * | 9/1994 | Moulton | E05B 37/20 | 292/80 |
| 5,383,098 A * | 1/1995 | Ma | H04B 1/3833 | 174/371 |
| 5,786,969 A * | 7/1998 | Fukushima | G11B 23/0308 | 360/133 |
| 6,009,069 A * | 12/1999 | Yamashita | G11B 23/0323 | 369/30.83 |
| 6,041,032 A * | 3/2000 | Ishida | G11B 17/30 | 369/30.41 |
| 6,042,157 A * | 3/2000 | Shimotsu | G02B 6/3893 | 220/326 |
| 6,526,017 B1 * | 2/2003 | Smith | G11B 15/68 | 369/178.01 |
| 6,608,766 B2 * | 8/2003 | Wortman | G06F 1/182 | 220/324 |
| 7,761,886 B2 * | 7/2010 | Yang | G11B 17/056 | 720/613 |
| 8,307,383 B2 * | 11/2012 | Kubo | G11B 23/0323 | 720/615 |
| 2001/0050897 A1 * | 12/2001 | Takai | G11B 17/223 | 720/635 |
| 2005/0023813 A1 * | 2/2005 | Biglino | B60R 21/232 | 280/743.2 |
| 2006/0143625 A1 * | 6/2006 | Chuo | G11B 17/223 | 720/614 |
| 2007/0108206 A1 * | 5/2007 | Hayashi | G11B 17/22 | 220/23.88 |
| 2011/0296449 A1 * | 12/2011 | Goto | G11B 17/223 | 720/728 |
| 2012/0120786 A1 * | 5/2012 | Goto | G11B 23/0328 | 369/258.1 |
| 2012/0212117 A1 * | 8/2012 | Ishiyama | G11B 23/041 | 312/298 |
| 2013/0139189 A1 * | 5/2013 | Yamasaki | G11B 17/056 | 720/613 |
| 2013/0347012 A1 * | 12/2013 | Maeda | G11B 23/0323 | 720/610 |
| 2020/0327907 A1 * | 10/2020 | Huang | G11B 33/0466 | |

* cited by examiner

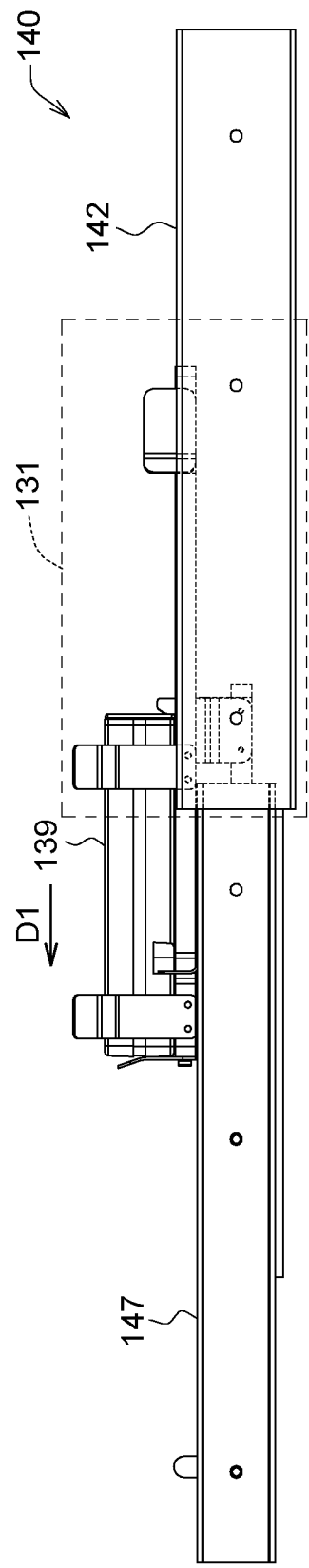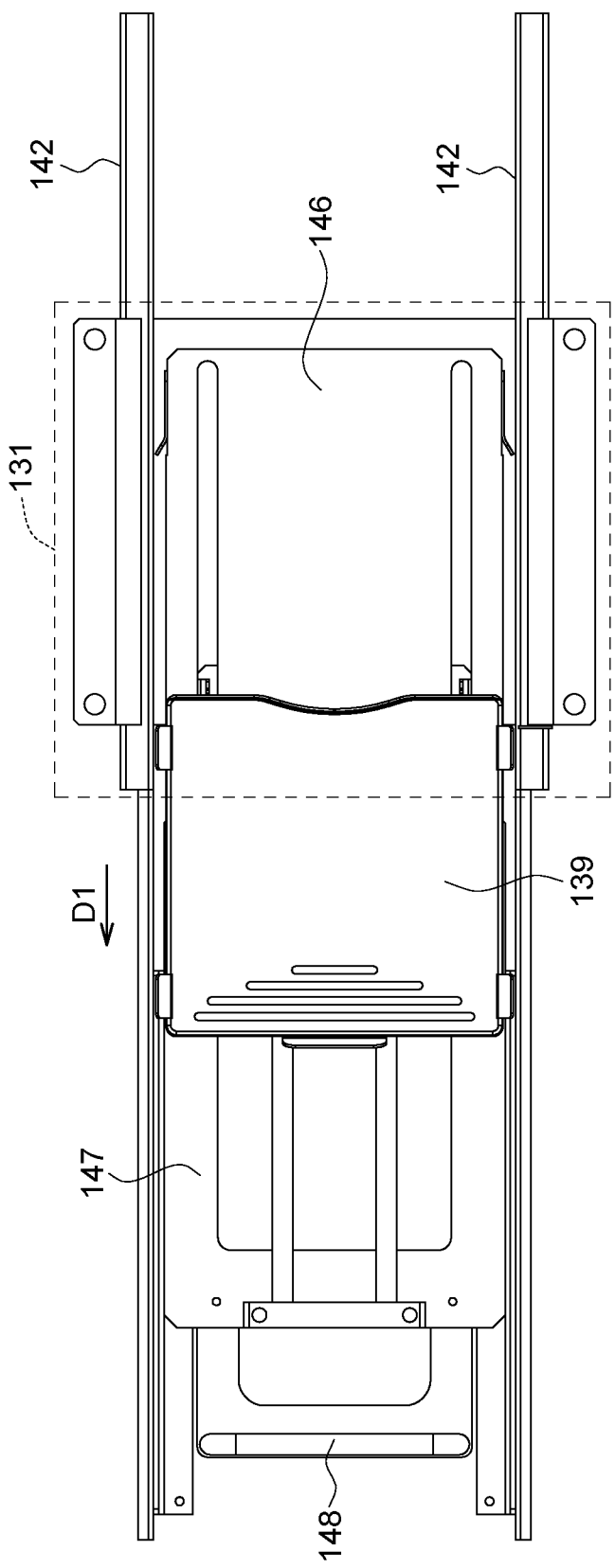

DISC LIBRARY STORAGE SYSTEM AND DISC CARTRIDGE USED THEREOF

This application claims the benefit of People's Republic of China application Serial No. 201910281002.5, filed Apr. 9, 2019, the subject matter of which is incorporated herein by reference.

BACKGROUND OF THE INVENTION

Field of the Invention

The invention relates in general to a database storage system, and more particularly to a disc library storage system having a disc changing device, and a disc cartridge used in the same.

Description of the Related Art

Generally speaking, disc drive is normally installed in a personal computer to read disc data or write data to the disc which is normally used to store a small volume of data. However, along with the development of big data, the database storage system is provided to store a large volume of data. Therefore, how to use discs as a storage medium and combine discs and disc drives to form a disc library storage system to increase the data preservation feature of discs and improve the data preservation performance of the database storage system has become a prominent task for the industries.

Besides, to avoid the discs being exposed, touched, pressed, polluted or damaged during the process of disc replacement, the disc storage device needs to be improved further.

SUMMARY OF THE INVENTION

The invention is directed to a disc library storage system and a disc cartridge used in the same capable of using discs as a storage medium for storing a large volume of data to improve data preservation. Meanwhile, the open and close mechanism of the disc cartridge is improved to increase the quality of disc replacement or feeding.

According to an embodiment of the present invention, a disc library storage system including a disc library, a disc drive tower, a disc transport device and a disc changing device is provided. The disc library is configured to accommodate multiple discs. The disc drive tower is configured to accommodate multiple disc drives. The multiple disc drives are configured to read disc data. The disc transport device is configured to move the discs to the disc drive tower from the disc library and to the disc library from the disc drive tower. The disc changing device is configured to place a disc cartridge, which includes an outer casing and a disc tray. The disc tray is configured to accommodate at least one replacement disc. The disc changing device has a pull-out state and a close state. When the disc changing device is in the close state, the disc tray of the disc cartridge is drawn from the outer casing, and the disc transport device unloads a replacement disc from the disc tray. When the disc changing device is in the pull-out state, the disc tray of the disc cartridge is received in the outer casing.

According to another embodiment of the present invention, a disc cartridge used in the disc library storage system is provided. The disc cartridge includes an outer casing and a disc tray. The outer casing has an opening, and the bottom of the outer casing has at least one buckle opening. The disc tray is received in the outer casing, and can be drawn from the outer casing via the opening. The bottom of the disc tray has at least one elastic buckle structure. When the disc tray is received in the outer casing, the elastic buckle structure is buckled in the buckle opening. The disc cartridge can be placed in or removed from the disc library storage system.

The above and other aspects of the invention will become better understood with regards to the following detailed description of the preferred but non-limiting embodiment(s). The following description is made with reference to the accompanying drawings.

BRIEF DESCRIPTION OF THE DRAWINGS

FIG. 5A and FIG. 5B respectively are a side view and a top view of the disc cartridge in a close state when the disc changing device is in a pull-out state.

DETAILED DESCRIPTION OF THE INVENTION

Figure 1:
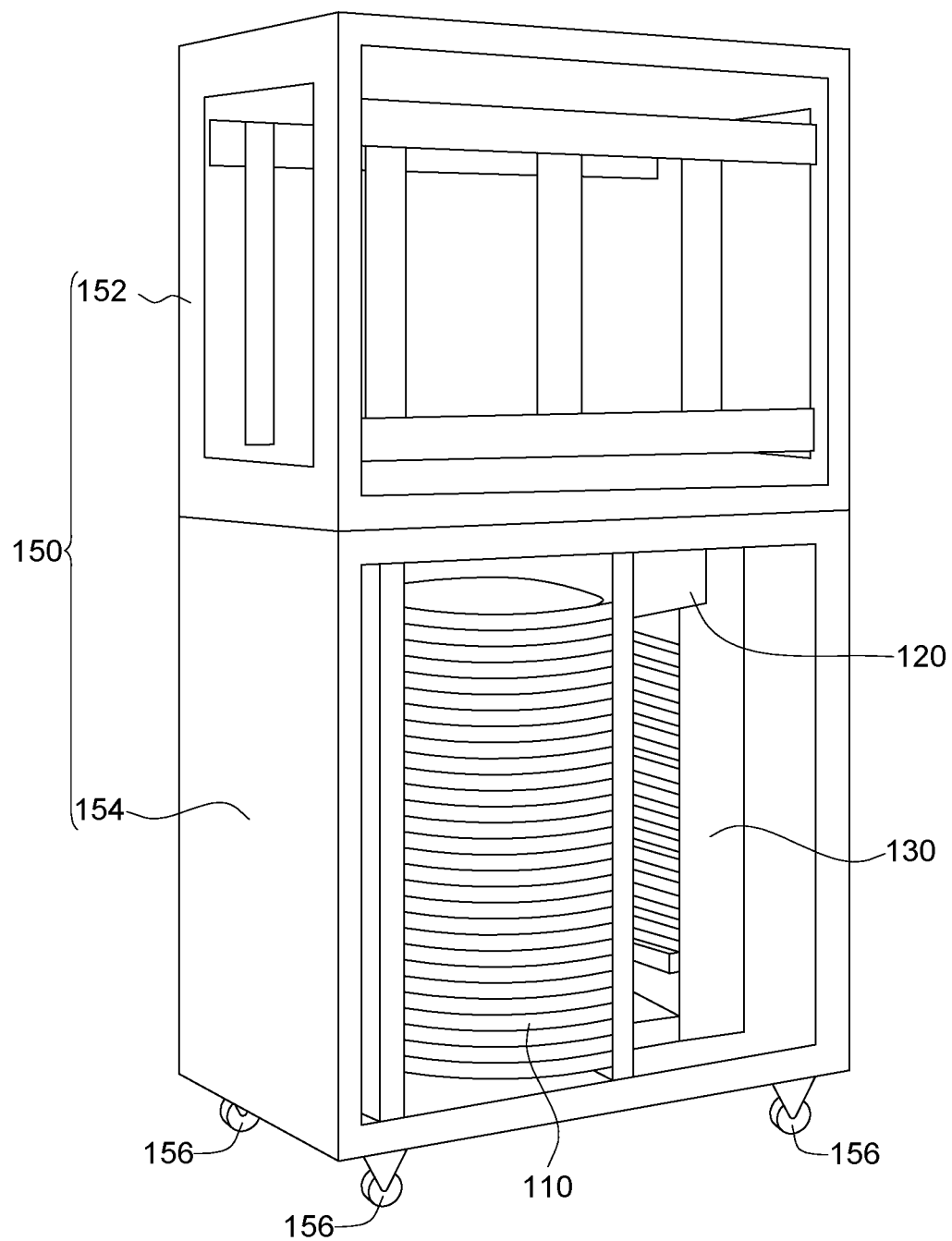
FIG. 1 is an appearance diagram of a disc library storage system according to an embodiment of the invention.

FIG. 1 is an appearance diagram of a disc library storage system according to an embodiment of the invention. The disc library storage system 100 includes a cabinet 150 configured to place a disc library 110, a disc transport device 120 and a disc drive tower 130. The disc library 110 is configured to accommodate multiple discs. The disc drive tower 130 includes multiple disc drives configured to read/write disc data. The disc transport device 120 is configured to move the disc to the disc drive tower 130 from the disc library 110 or to the disc library 110 from the disc drive tower 130 and both.

Figure 2:
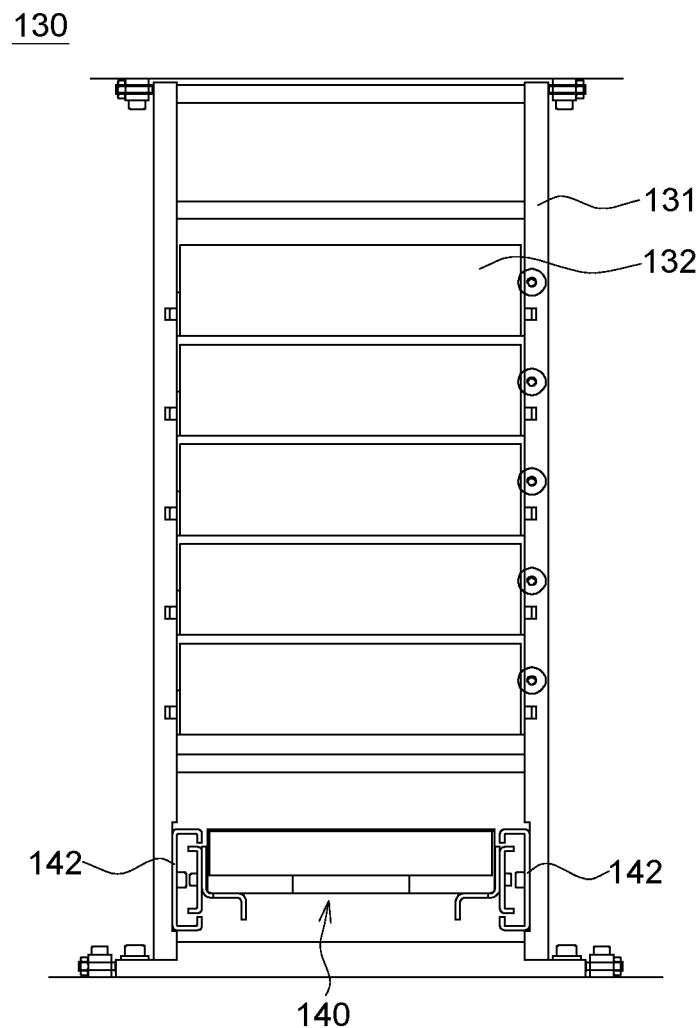
FIG. 2 is a side view of a disc drive tower according to an embodiment of the invention.

For the convenience of directly replacing the discs in the disc library 110 from outside the disc library storage system 100, the disc library storage system 100 further includes a disc changing device 140. Referring to FIG. 2, a side view of a disc drive tower according to an embodiment of the invention is shown. The disc drive tower 130 includes a cabinet body 131 configured to accommodate multiple disc drives 132. In an embodiment of the invention, the disc changing device 140 is disposed in the cabinet body 131 of the disc drive tower 130 and located under the multiple disc drives 132. However, the disc changing device 140 is not limited to be disposed in the cabinet body 131 of the disc drive tower 130. The disc changing device 140 can be disposed at any position of the cabinet 150 where the disc transport device 120 can grab the disc to be replaced from the disc changing device 140.

Moreover, for avoiding the disc being scratched or polluted during the process of disc replacement, a disc cartridge is further provided to the disc changing device of the disc library storage system. A number of embodiments relating to the disc changing device and the disc cartridge of the invention are disclosed below.

Figure 3A:
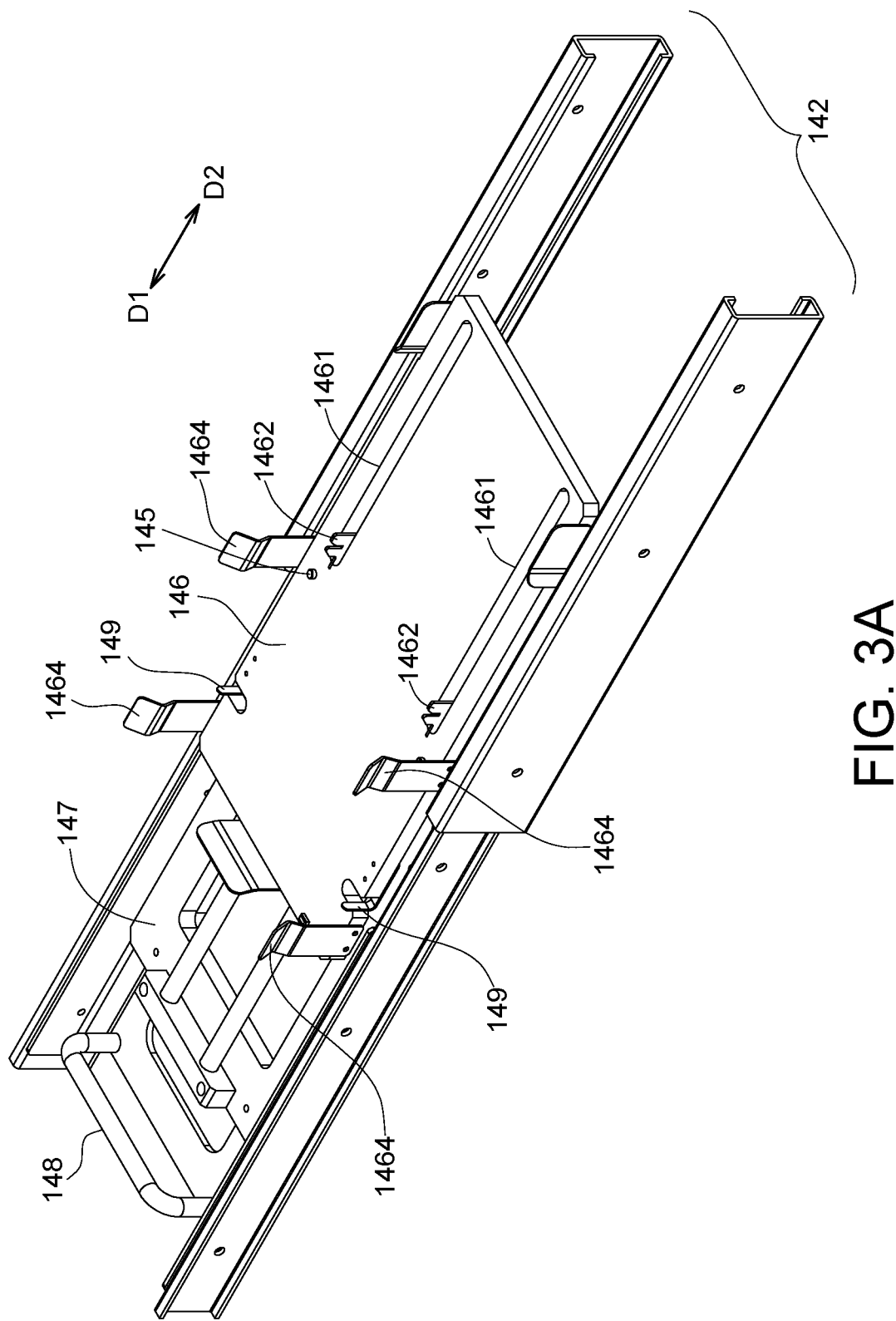
FIG. 3A and FIG. 3B are schematic diagrams of the disc changing device used in the disc library storage system according to an embodiment of the invention in a pull-out state and in a close state respectively.
Figure 3B:
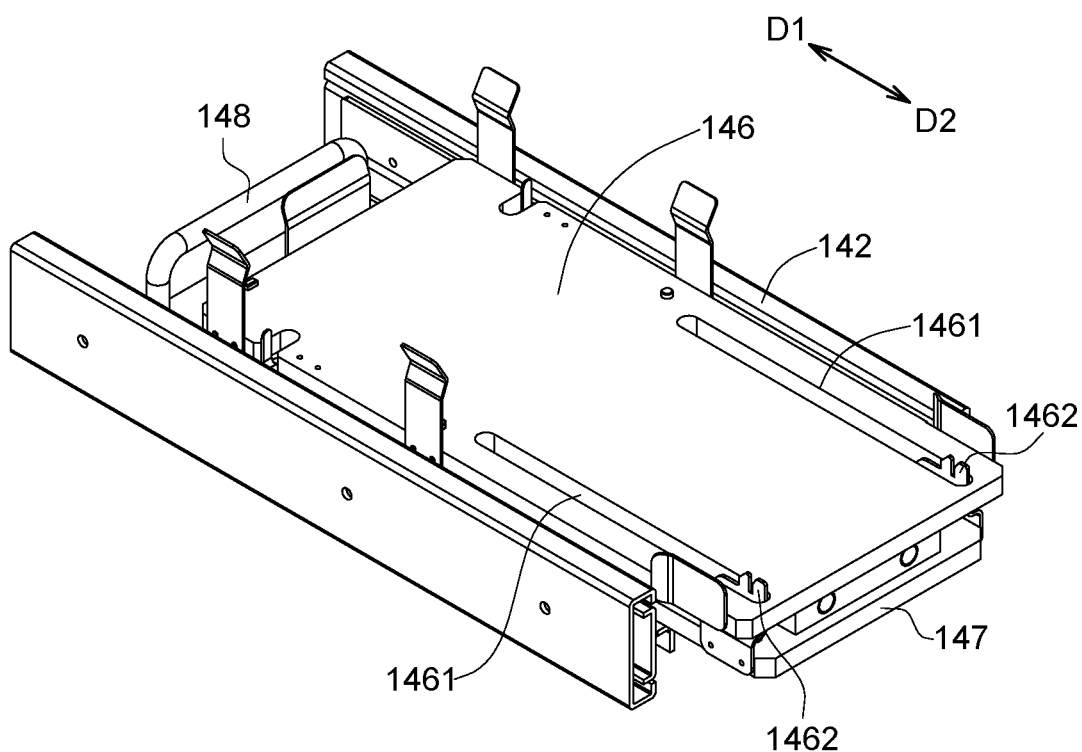
Figure 4A:
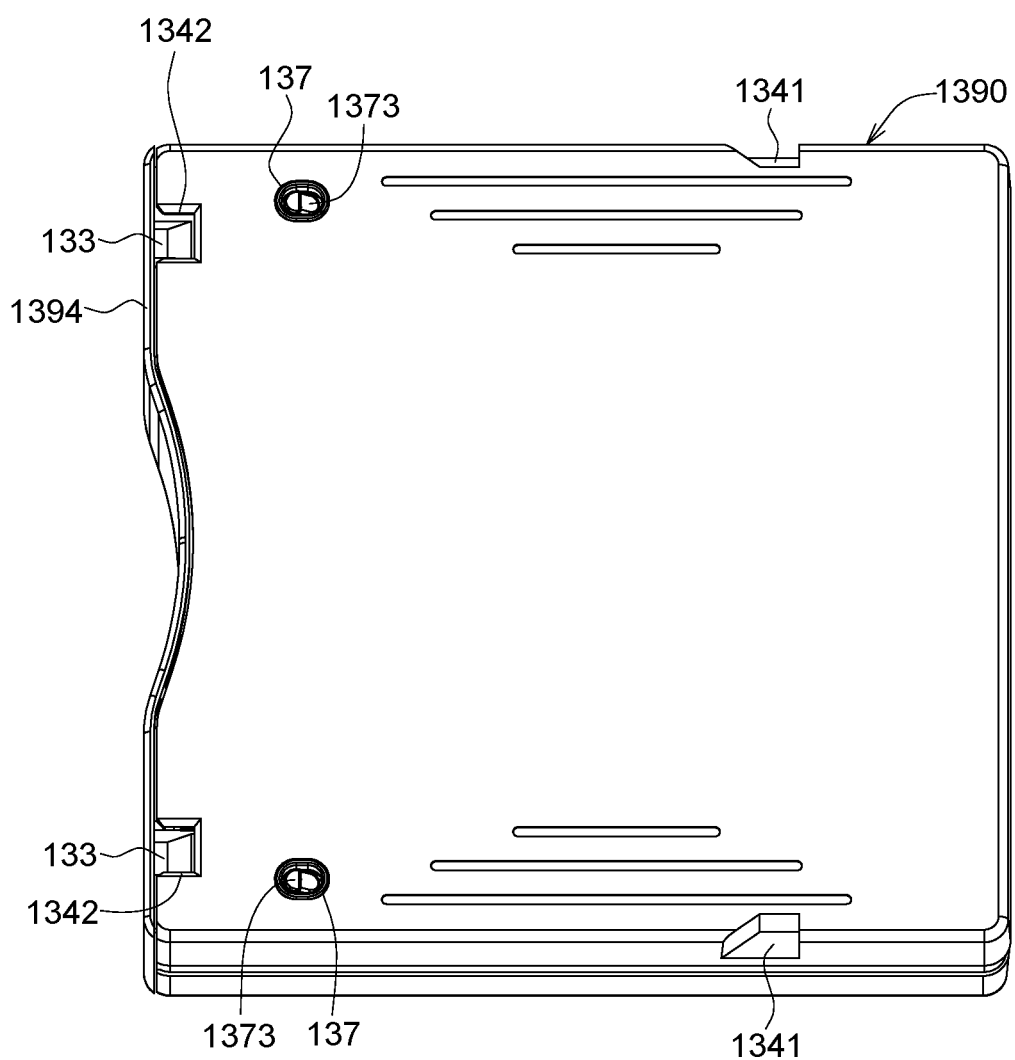
FIG. 4A is a schematic diagram of the bottom of the disc cartridge in a close state.
Figure 4B:
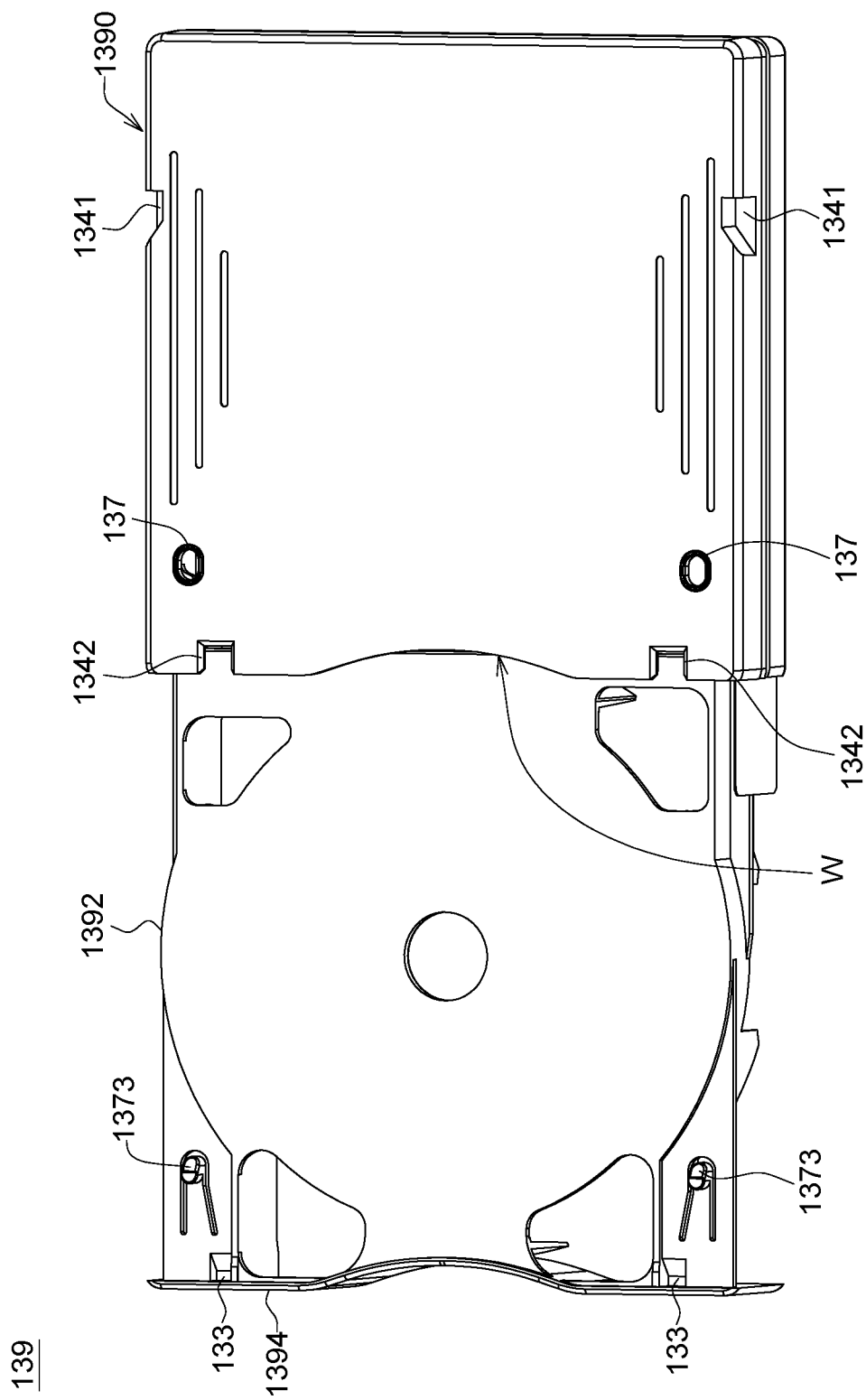
FIG. 4B is a schematic diagram of the bottom of the disc cartridge in an open state.

FIG. 3A and FIG. 3B are schematic diagrams of the disc changing device 140 used in the disc library storage system 100 according to an embodiment of the invention in a pull-out state and in a close state respectively. FIG. 4A and FIG. 4B are schematic diagrams of the bottom of the disc cartridge 139 in a close state and an open state respectively.

Refer to FIG. 3A. The disc changing device 140 includes a track seat 142, a moveable seat 147 and a bearing seat 146. The disc changing device 140 is disposed in the cabinet 150 through the track seat 142. In an embodiment as indicated in FIG. 2, the disc changing device 140 is disposed in the cabinet body 131 of the disc drive tower 130 in the cabinet 150 through the track seat 142. The track seat 142, the moveable seat 147 and the bearing seat 146 can slide relatively to one another. In an embodiment, the moveable seat 147 and the bearing seat 146 respectively are slidably disposed on the track seat 142, such that the track seat 142, the moveable seat 147 and the bearing seat 146 can slide relatively to one another. In another embodiment, the moveable seat 147 is slidably disposed on the track seat 142 and the bearing seat 146 is slidably disposed on the moveable seat 147, such that the track seat 142, the moveable seat 147 and the bearing seat 146 can slide relatively to one another.

The bearing seat 146 is configured to carry the disc cartridge 139, and has at least one limiting structure 149, at least one ejection structure 145, at least one guide slot 1461 and multiple clamping members 1464. The clamping members 1464 are configured to clamp the disc cartridge 139 on the bearing seat 146. The extending direction of the guide slot 1461 is parallel to the extending direction of the track seat 142.

The moveable seat 147 has a handle 148 and at least one pull hook structure 1462. The pull hook structure 1462 is disposed in the guide slot 1461, and can move within the guide slot 1461. The operator can hold the handle 148 to push the moveable seat 147 along the track seat 142 in the close direction D2 and cause the disc changing device 140 to enter a close state (as indicated in FIG. 3B) from a pull-out state (as indicated in FIG. 3A). Or, the operator can pull out the moveable seat 147 along the track seat 142 in the pull-out direction D1 and cause the disc changing device 140 to enter the pull-out state (as indicated in FIG. 3A) from the close state (as indicated in FIG. 3B). The pull hook structure 1462 can move together with the moveable seat 147 and the handle 148, and thus can move within the guide slot 1461.

Besides, the movement of the moveable seat 147 relative to the bearing seat 146 is limited by the length range of the guide slot 1461. Specifically, the moveable seat 147 can move relative to the bearing seat 146 in the pull-out direction D1 until the pull hook structure 1462 is moved to one end of the guide slot 1461 close to the pull-out direction D1, the moveable seat 147 can move relative to the bearing seat 146 in the close direction D2 until the pull hook structure 1462 is moved to the other end of the guide slot 1461 close to the close direction D2.

Refer to FIG. 4A and FIG. 4B. The disc cartridge 139 includes an outer casing 1390 and a disc tray 1392. The disc tray 1392 is configured to accommodate multiple discs. The outer casing 1390 has an opening W. The disc tray 1392 has a front panel 1394. The disc tray 1392 can be drawn from the outer casing 1390 via the opening W and cause the disc cartridge 139 to enter an open state (as indicated in FIG. 4B). When the disc cartridge 139 is in a close state (as indicated in FIG. 4A), the disc tray 1392 is in the outer casing 1390, and the front panel 1394 of the disc tray 1392 covers the opening W of the outer casing 1390.

The bottom of the disc tray 1392 has at least one elastic buckle structure 1373, and the part of the bottom of the disc tray 1392 adjacent to the front panel 1394 has at least one pull hook groove 133. The bottom of the outer casing 1390 includes at least one limiting groove 1341, at least one buckle opening 137 and at least one pull hook opening 1342. When the disc cartridge 139 in the close state (as indicated in FIG. 4A), the elastic buckle structure 1373 of the bottom of the disc tray 1392 is buckled in the buckle opening 137 of the bottom of the outer casing 1390, such that and causes the disc tray 1392 to be locked in the outer casing 1390 and not to be drawn from the outer casing 1390. Also, when the disc cartridge 139 in the close state (as indicated in FIG. 4A), the pull hook groove 133 of the disc tray 1392 corresponds to the pull hook opening 1342 of the outer casing 1390.

When the disc cartridge 139 in the close state is placed on the bearing seat 146, the pull hook structure 1462 of the moveable seat 147 can be engaged with the pull hook groove 133 of the disc tray 1392 through the pull hook opening 1342 of the outer casing 1390. Moreover, the ejection structure 145 of the bearing seat 146 can push the elastic buckle structure 1373 of the disc tray 1392 upwards through the buckle opening 137 of the outer casing 1390, such that the elastic buckle structure 1373 can be detached from the buckle opening 137, and the disc tray 1392 can be drawn from the outer casing 1390. Furthermore, the limiting structure 149 of the bearing seat 146 is located within the limiting groove 1341 of the outer casing 1390. Therefore, when the moveable seat 147 moves along the track seat 142 and drives the pull hook structure 1462 to move along the guide slot 1461, the outer casing 1390 is limited by the limiting structure 149 and fixed on the bearing seat 146, such that the pull hook structure 1462 can drive the disc tray 1392 to be drawn from or received in the outer casing 1390 through the pull hook groove 133.

In an embodiment of the invention, the movement of the bearing seat 146 relative to the track seat 142 has a pull-out positioning point (as indicated in FIG. 3A) and a close positioning point (as indicated in FIG. 3B). When the bearing seat 146 is located at the pull-out positioning point, the bearing seat 146 cannot move relative to the track seat 142 further in the pull-out direction D1. When the bearing seat 146 is located at the close positioning point, the bearing seat 146 cannot move relative to the track seat 142 further in the pull-out direction D2. In practical implementation, an interfering structure, such as a blocker, can be interposed between the bearing seat 146 and the track seat 142 to limit the movement range of the bearing seat 146 relative to the track seat 142 and further define the final positions (the pull-out positioning point and the close positioning point) of the bearing seat 146 relative to the track seat 142 in the pull-out direction D1 and in the close direction D2 respectively.

Moreover, when the bearing seat 146 is located at the pull-out positioning point or the close positioning point, the moveable seat 147 still can move relative to the bearing seat 146. As indicated in FIG. 3A and FIG. 3B, when the bearing seat 146 is located at the pull-out positioning point or the close positioning point, the moveable seat 147 still can move relative to the bearing seat 146 within the length range of the guide slot 1461.

Refer to FIG. 3A. When the disc changing device 140 is in the pull-out state, the bearing seat 146 is located at the pull-out positioning point, and the pull hook structure 1462 of the moveable seat 147 is located at one end of the guide slot 1461 close to the pull-out direction D1. Meanwhile, the bearing seat 146 cannot move relative to the track seat 142 in the pull-out direction D1 further, and the moveable seat 147 cannot move relative to the bearing seat 146 in the pull-out direction D1 further.

Refer to FIG. 3B. When the disc changing device 140 is in the close state, the bearing seat 146 is located at the close positioning point, and the pull hook structure 1462 of the moveable seat 147 is located at one end of the guide slot 1461 close to the close direction D2. Meanwhile, the bearing seat 146 cannot move relative to the track seat 142 in the close direction D2 further, and the moveable seat 147 cannot move relative to the bearing seat 146 in the close direction D2 further.

The operations of the disc changing device 140 are disclosed below. Referring to FIG. 5A and FIG. 5B, a side view and a top view of the disc cartridge 139 in a close state when the disc changing device 140 is in a pull-out state are respectively shown. The operator can pull the moveable seat 147 out along the track seat 142 in the pull-out direction D1 through the handle 148, and can drive the bearing seat 146 to move in the pull-out direction D1 through the pull hook structure 1462, such that the disc changing device 140 is in the pull-out state. As indicated in FIG. 5A and FIG. 5B, when the disc changing device 140 is in the pull-out state, the part of the bearing seat 146 configured to place the disc cartridge 139 will be moved outside the cabinet body 131, and the pull hook structure 1462 of the moveable seat 147 is located at one end of the guide slot 1461 close to the pull-out direction D1. Meanwhile, the operator can place the disc cartridge 139 in the close state on the bearing seat 146 or remove the disc cartridge 139 in the close state from the bearing seat 146.

Figure 6A:
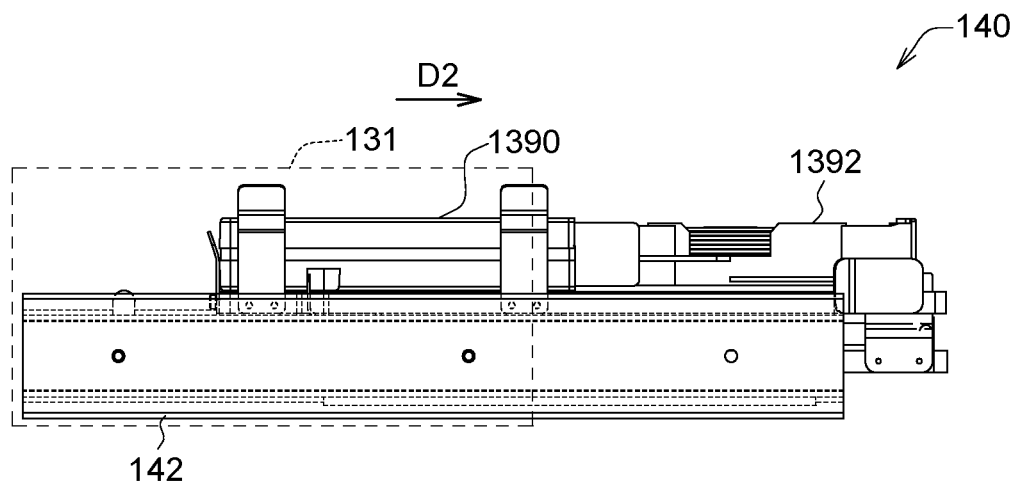
FIG. 6A and FIG. 6B respectively are a side view and a top view of the disc cartridge in an open state when the disc changing device is in a close state.
Figure 6B:
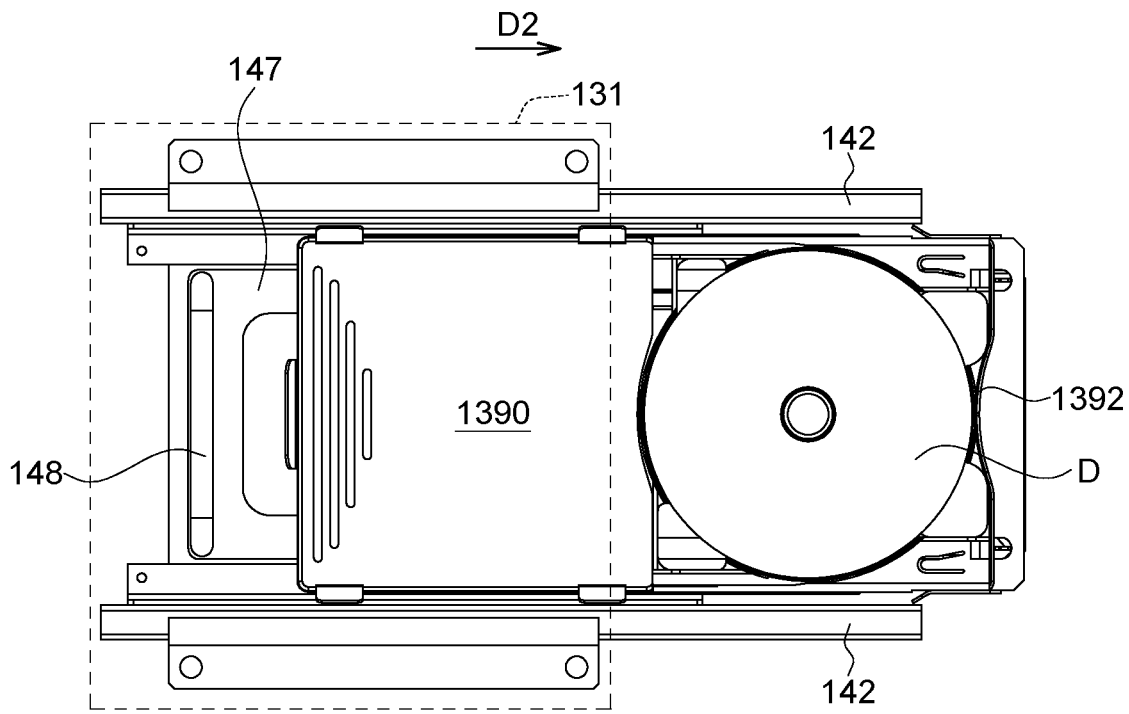

Referring to FIG. 6A and FIG. 6B, a side view and a top view of the disc cartridge 139 in an open state when the disc changing device 140 is in a close state are respectively shown. The operator can push the moveable seat 147 along the track seat 142 in the close direction D2 through the handle 148 and can drive the bearing seat 146 to move in the close direction D2, such that the disc changing device 140 is in the close state. As indicated in FIG. 6A and FIG. 6B, when the disc changing device 140 is in the close state, the disc cartridge 139 will be moved into the cabinet body 131, and the disc tray 1392 of the disc cartridge 139 will be drawn from the outer casing 1390 and from the cabinet body 131, such that the disc tray 1392 of the disc cartridge 139 is located at a disc placement position, at which the disc transport device 120 can grab the disc, and can further load or unload the disc D.

As disclosed above, when the disc cartridge 139 is placed on the bearing seat 146, the pull hook structure 1462 of the moveable seat 147 is engaged with the pull hook groove 133 of the disc tray 1392, and the ejection structure 145 of the bearing seat 146 causes the elastic buckle structure 1373 to be detached from the buckle opening 137 and causes the disc tray 1392 to be released from the outer casing 1390. Therefore, when the disc changing device 140 enters the close state from the pull-out state, the pull hook structure 1462 of the moveable seat 147 moves to one end of the guide slot 1461 close to the close direction D2 from the other end of the guide slot 1461 close to the pull-out direction D1. Meanwhile, the pull hook structure 1462 of the moveable seat 147 causes the disc tray 1392 to be drawn from the outer casing 1390 through the pull hook groove 133 of the disc tray 1392.

Conversely, when the disc changing device 140 enters the pull-out state from the close state, the pull hook structure 1462 of the moveable seat 147 moves to one end of the guide slot 1461 close to the pull-out direction D1 from the other end of the guide slot 1461 close to the close direction D2. Meanwhile, the pull hook structure 1462 of the moveable seat 147 causes the disc tray 1392 to be received in the outer casing 1390 through the pull hook groove 133 of the disc tray 1392.

According to the disc changing device 140 and the disc cartridge 139 disclosed in an embodiment of the invention, the disc cartridge 139 can be removed from the cabinet body 131 through the action of the disc changing device 140 (pulling out), such that the operator can place the disc cartridge 139 in the close state on the bearing seat 146 or remove the disc cartridge 139 in the close state from the bearing seat 146. Besides, the disc cartridge 139 can cause the disc tray 1392 of the disc cartridge 139 to be received in or drawn from the outer casing 1390 through the action of the disc changing device 140 (pulling out or closing).

In the present embodiment as disclosed above, the efficiency of disc replacement or feeding can be increased using the disc changing device 140 and the disc cartridge 139, and system efficiency can maintain at a high level. Meanwhile, since the operator does not touch the discs in the disc cartridge 139 when removing or placing the disc cartridge 139, the discs will not be damaged.

To enhance the stability and protection of the discs placed in the disc cartridge, a disc cartridge 139 including the following features is disclosed in an embodiment of the invention.

Figure 7A:
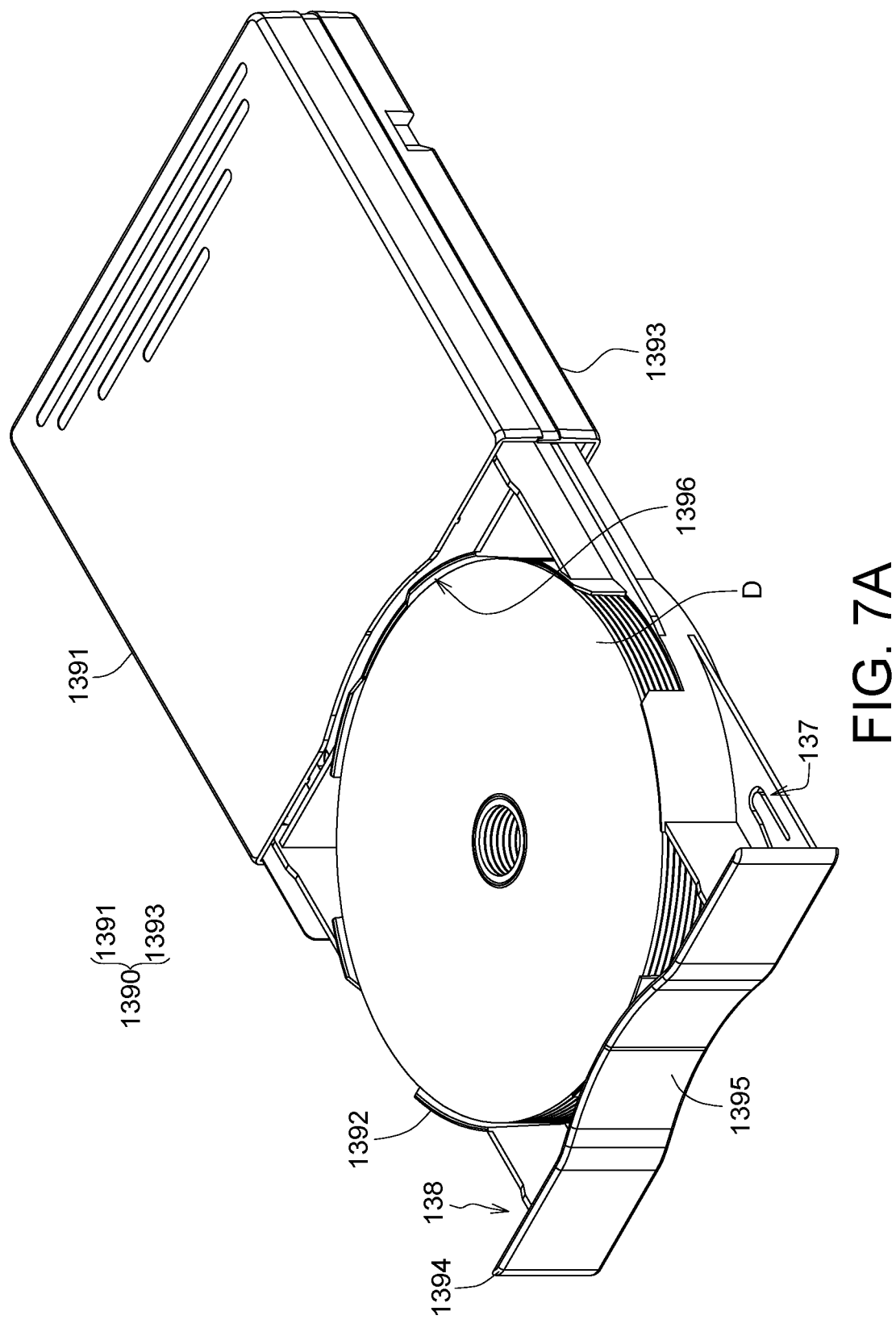
FIG. 7A is a schematic diagram of the disc cartridge used in the disc library storage system in an open state.
Figure 7B:
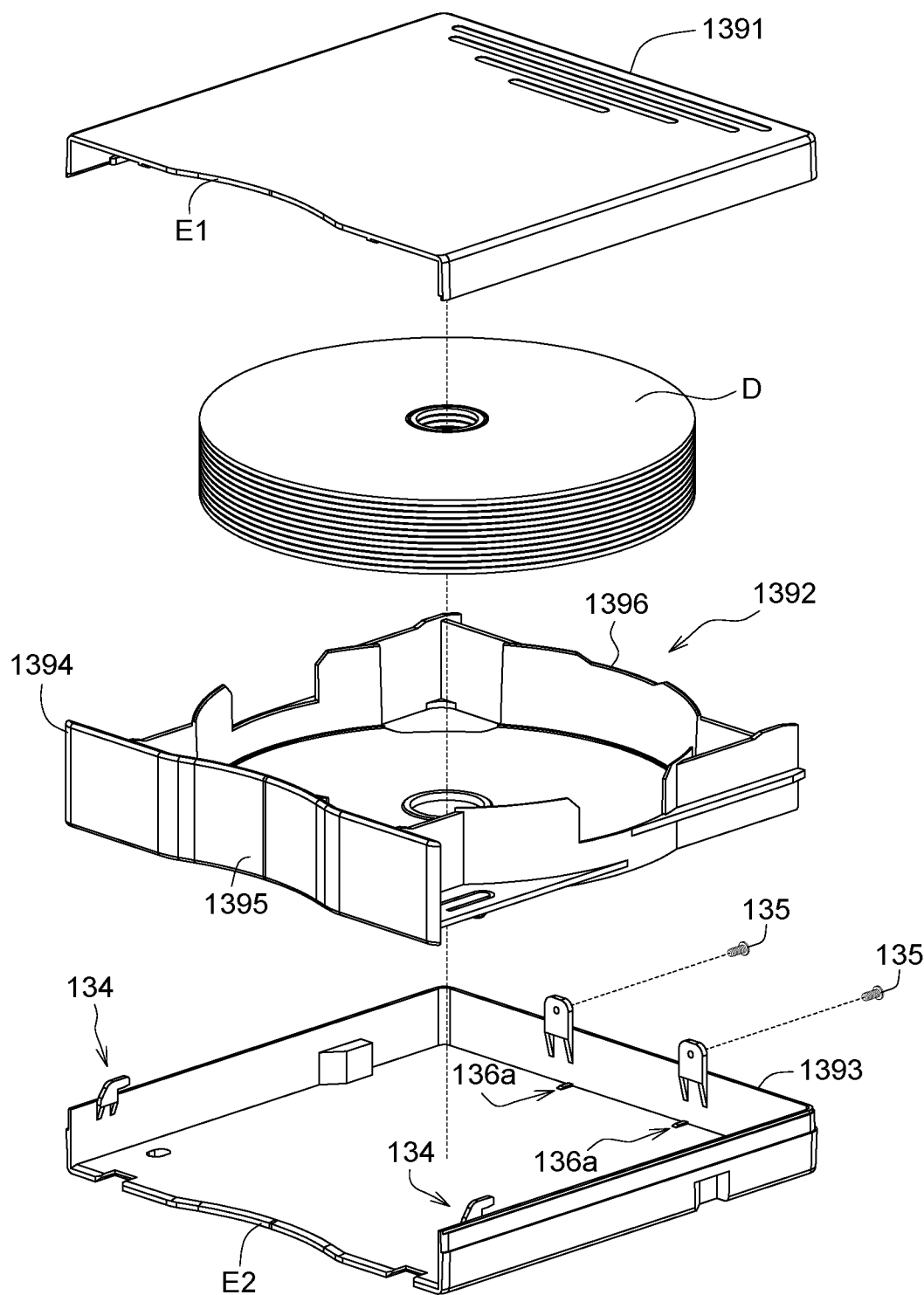
FIG. 7B is an explosion diagram of a disc cartridge.
Figure 8A:
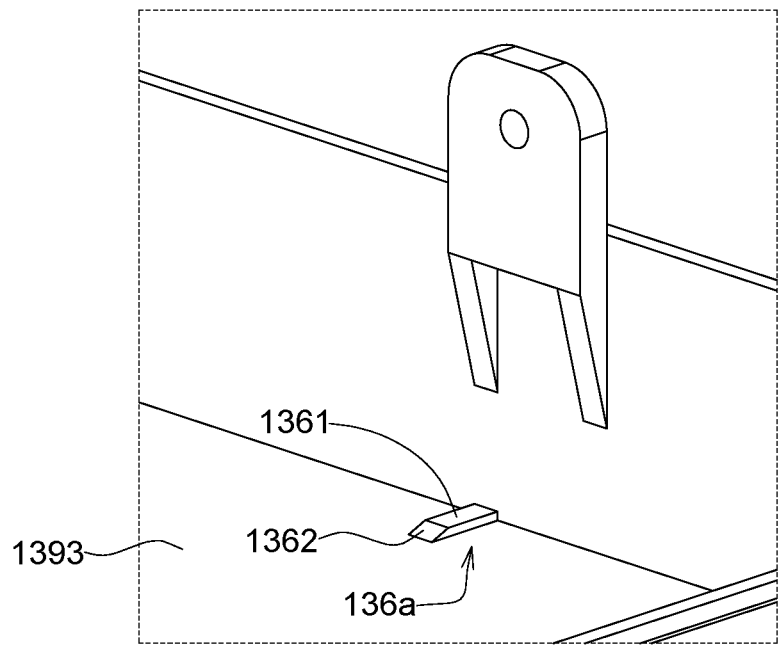
FIG. 8A is a schematic diagram of a rising structure.
Figure 8B:
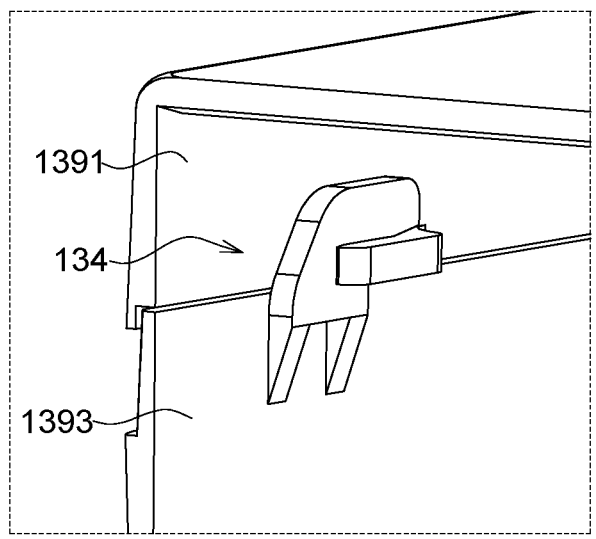
FIG. 8B is a schematic diagram of a buckle structure.
Figure 9:
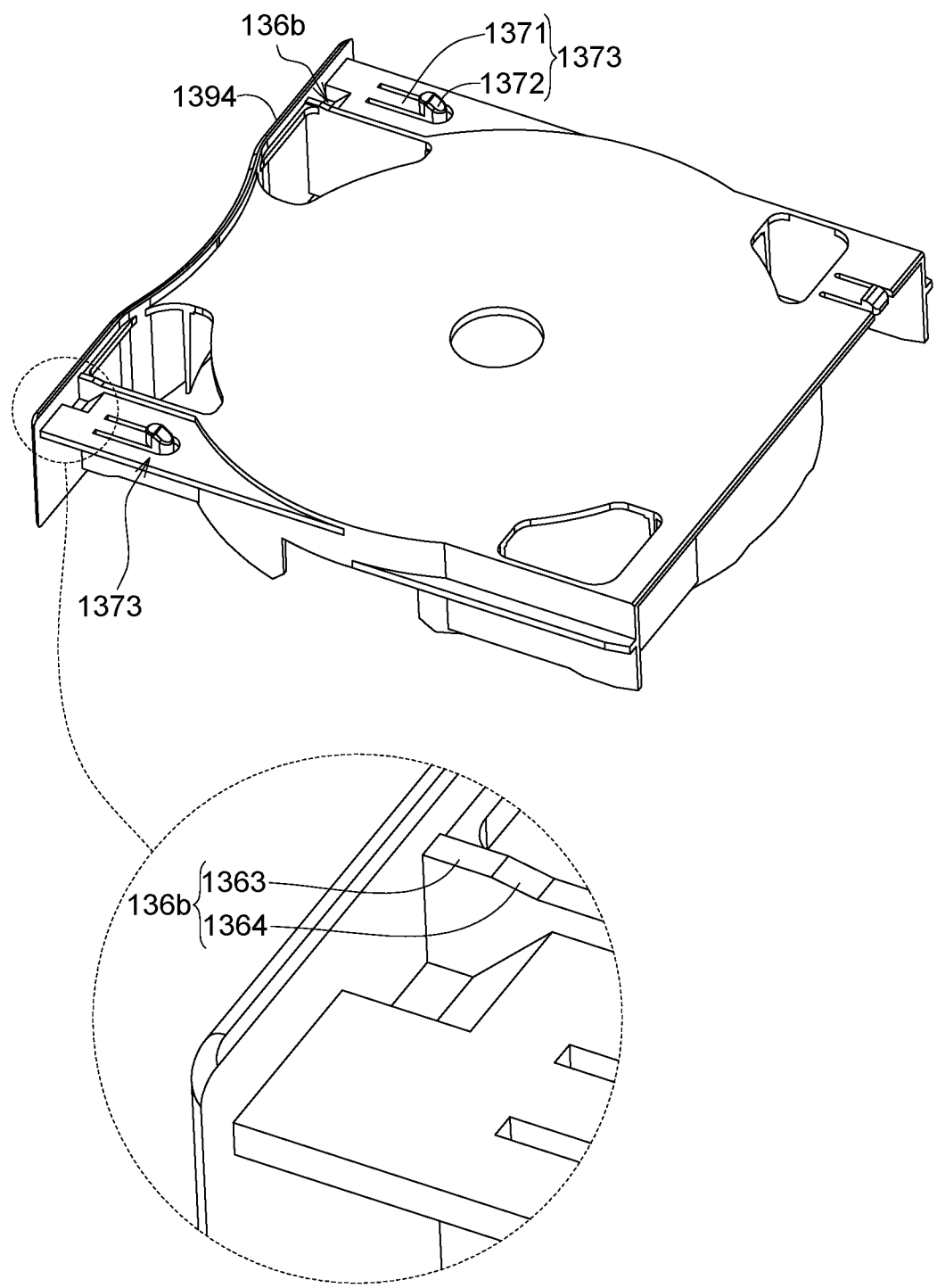
FIG. 9 is a schematic diagram of the bottom of a disc tray having an enlarged view.
Figure 10:
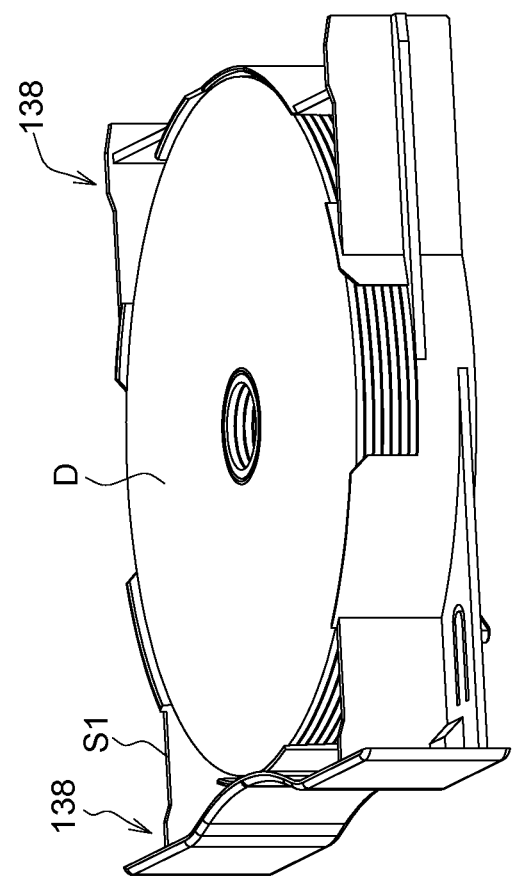
FIG. 10 is a schematic diagram of a disc tray.
Figure 11:
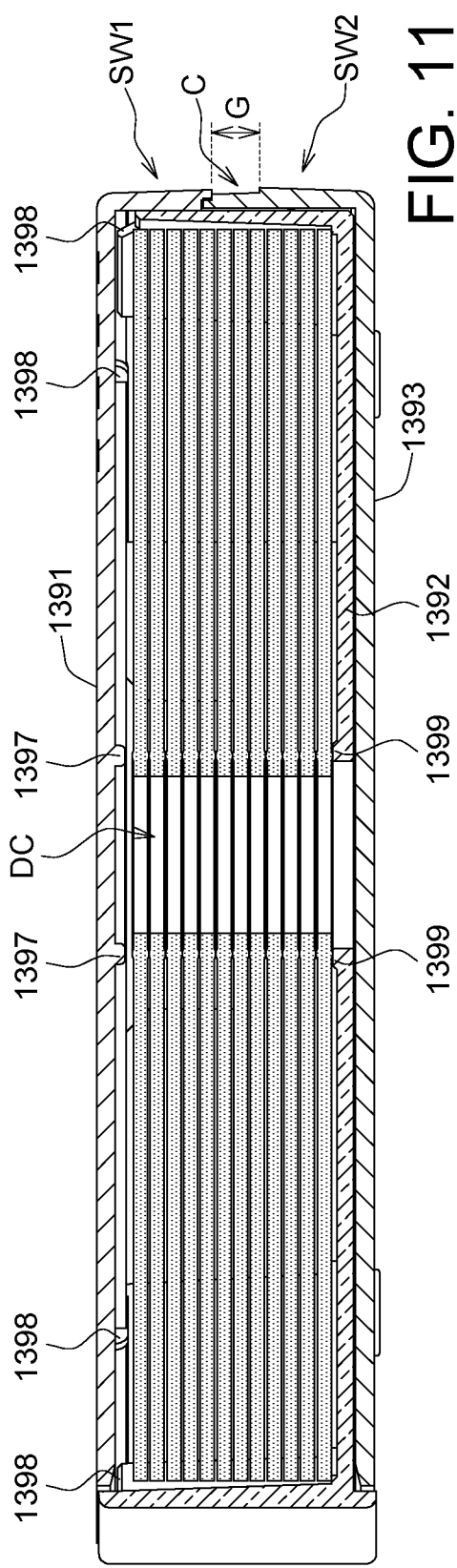
FIG. 11 is a cross-sectional view of a disc cartridge.

FIG. 7A is a schematic diagram of the disc cartridge 139 used in the disc library storage system 100 in an open state. FIG. 7B is an explosion diagram of a disc cartridge 139. FIG. 8A is a schematic diagram of a rising structure 136a. FIG. 8B is a schematic diagram of a buckle structure 134. FIG. 9 is a schematic diagram of the bottom of a disc tray 1392. FIG. 10 is a schematic diagram of a disc tray 1392. FIG. 11 is a cross-sectional view of a disc cartridge 139.

Refer to FIG. 7A and FIG. 7B. The outer casing 1390 of the disc cartridge 139 includes an upper cover 1391 and a bottom casing 1393, and the upper cover 1391 and the bottom casing 1393 are opposite to each other. The disc tray 1392 is interposed between the upper cover 1391 and the bottom casing 1393 to accommodate multiple discs D. In an embodiment as indicated in FIG. 8B, the two opposite side walls of the upper cover 1391 and the two opposite side walls of the bottom casing 1393 have a buckle structure 134 through which the upper cover 1391 can be engaged with the bottom casing 1393. Besides, the rear side wall of the upper cover 1391 is locked and fixed on the rear side wall of the bottom casing 1393 by one or multiple locking members 135 (as indicated in FIG. 7B).

Furthermore, the front panel 1394 of the disc tray 1392 has a concave curved surface 1395, and the upper cover 1391 and the bottom casing 1393 respectively have a concave front edge E1 and a concave front edge E2 corresponding to the upper edge and the lower edge of the concave curved surface 1395, wherein the concave front edge E1 and the concave front edge E2 are aligned with each other. When the disc cartridge 139 is in the close state, the front side of the disc cartridge 139 is recessed. Besides, the rear end of the disc tray 1392 has a convex curved surface 1396 opposite to the concave curved surface 1395 and matching the curve of the disc D. In the present embodiment, when the disc tray 1392 is pulled out, the convex curved surface 1396 of the disc tray 1392 can be aligned with the concave front edge E1 of the upper cover 1391 as indicated in FIG. 7A. Therefore, when the disc D is unloaded or loaded, the rear end of the disc D will not touch the upper cover 1391 to avoid the disc D being damaged.

As indicated in FIG. 8A, the rear bottom of the inner surface of the bottom casing 1393 has a rising structure 136a. The rising structure 136a is close to the rear side wall of the bottom casing 1393, and has a top surface 1361 and a bevel 1362. The top surface 1361 has a pre-determined height. The bevel 1362 faces the front side and is downwardly extended to the inner surface of the bottom casing 1393 from the top surface 1361. In the present embodiment, when the disc tray 1392 moves into the outer casing 1390 and touches the rising structure 136a, the bevel 1362 causes the disc tray 1392 to move upwards and causes the disc tray 1392 to lean on the top surface 1361 such that the gap between the rear end of the upper cover 1391 and the disc tray 1392 can be reduced.

As indicated in FIG. 9, the lower surface of the disc tray 1392 has an abutting structure 136b. The abutting structure 136b is close to the front panel 1394, and has a bottom 1363 and a bevel 1364. The bottom 1363 has a pre-determined height. The bevel 1364 faces backwards and is upwardly extended to the lower surface of the disc tray 1392 from the bottom 1363. In the present embodiment, when the disc tray 1392 moves into the outer casing 1390 and the abutting structure 136b touches the bottom casing 1393, the bevel 1364 causes the disc tray 1392 to move upwards and causes the bottom 1363 of the abutting structure 136b to lean on the bottom casing 1393, such that the gap between the front end of the upper cover 1391 and the disc tray 1392 can be reduced.

Furthermore, the elastic buckle structure 1373 is disposed on the lower surface of the disc tray 1392. The elastic buckle structure 1373 has an elastic arm 1371 and a protrusion 1372 located at the terminal end of the elastic arm 1371, such that the protrusion 1372 can be pressed and moved. When the disc tray 1392 moves into the outer casing 1390, the protrusion 1372 can be pressed and then can bounce back and become engaged in the opening 137 of the bottom casing 1393 as indicated in FIG. 4A. To remove the disc tray 1392, the protrusion 1372 is ejected upward via the opening 137 and causes the disc tray 1392 to be detached from the bottom casing 1393.

As indicated in FIG. 10, the upper surface of the disc tray 1392 has a disc anti-pressure structure 138 whose height is higher than that of the upper surface S1 of the disc tray 1392. When the upper cover 1391 is pressed and becomes deformed, the disc anti-pressure structure 138 and the upper cover 1391 can be relatively close and come into contact, lest the upper cover 1391 might press the disc D. As indicated in FIG. 11, the inner surface of the upper cover 1391 has a lower convex ring 1397, and the inner surface of the disc tray 1392 has an upper convex ring 1399, wherein the lower convex ring 1397 and the upper convex ring 1399 respectively correspond to the area above the center hole DC of the disc and the area under the center hole DC of the disc. Besides, the inner surface of the upper cover 1391 further has multiple stopping bumps 1398 leaning on the outer edge of the outmost disc. The upper convex ring 1399, the lower convex ring 1397 and the stopping bumps 1398 can all be used as an anti-vibration structure for reducing the wobbling of the disc and avoiding the data region of the disc being scratched.

Refer to FIG. 11. During the manufacturing of the upper cover 1391 and the bottom casing 1393, the outer side wall SW1 of the upper cover 1391 has a release angle (greater than 90°) near a corner, and the outer side wall SW2 of the bottom casing 1393 has a release angle (greater than 90°) near the opposite corner. After the upper cover 1391 and the bottom casing 1393 are coupled, the two outer side walls of the outer casing 1390 tilt to the center from the two opposite sides and are not planar. To avoid the release angle being too large and causing the disc cartridge 139 to tilt, in the present embodiment, the slit C between the outer side wall SW1 of the upper cover 1391 and the outer side wall SW2 the bottom casing 1393 can be widened, such that the disc cartridge 139 can have a larger supporting area and is less likely to tilt when the disc cartridge 139 is erected.

To increase the delivery convenience of the disc library storage system, a combination cabinet 150 is provided in an embodiment of the invention.

Figure 12A:
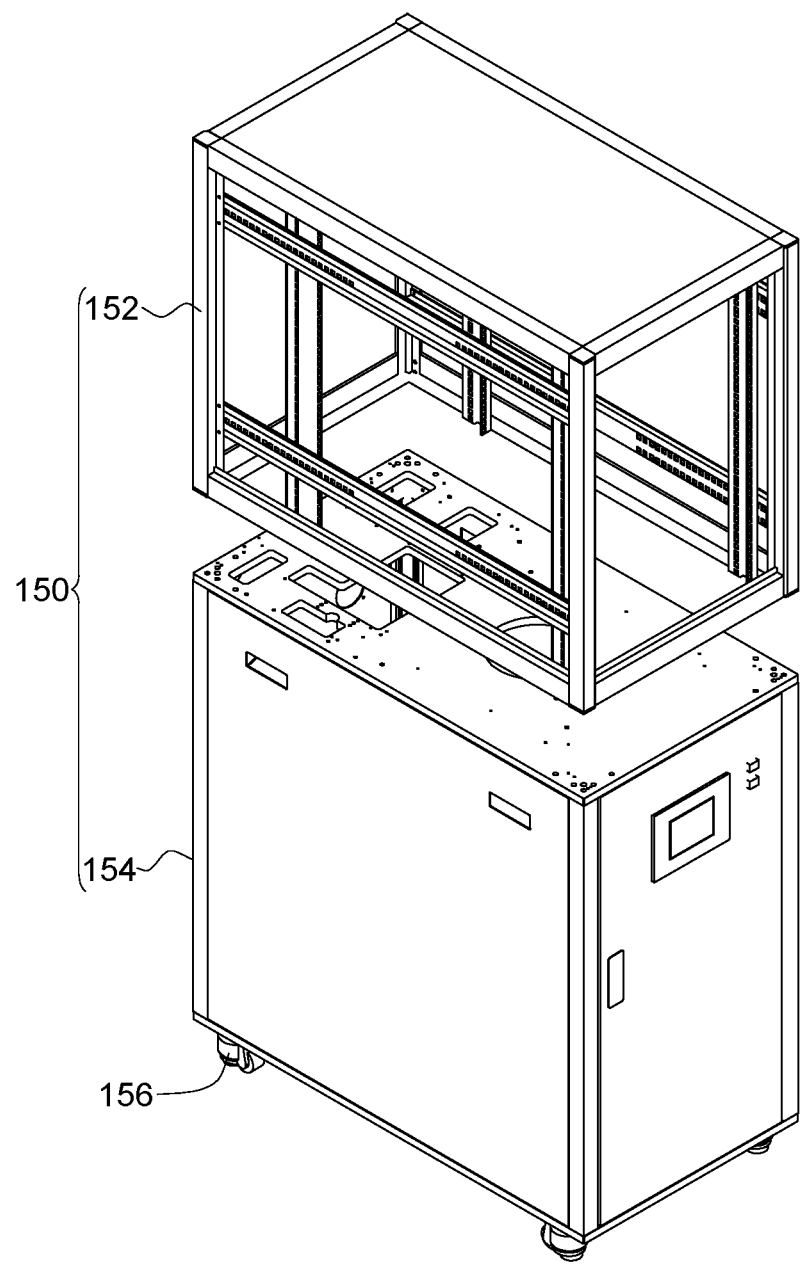
FIG. 12A is an explosion diagram of a cabinet according to an embodiment of the invention.
Figure 12B:
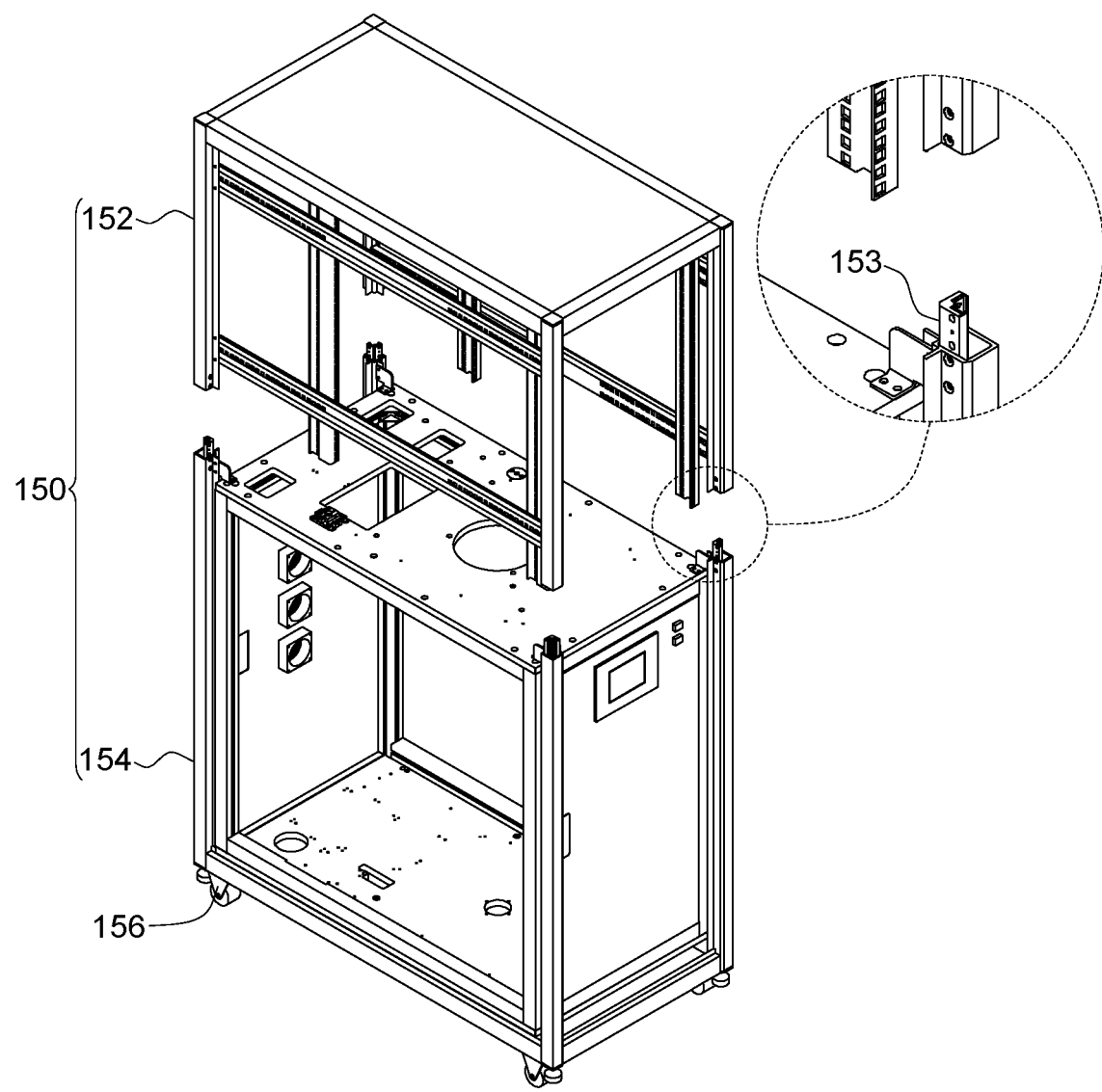
FIG. 12B is an explosion diagram of a cabinet having an enlarged view according to another embodiment of the invention.

Referring to FIG. 12A, an explosion diagram of a cabinet 150 according to an embodiment of the invention is shown. The cabinet 150 includes an upper cabinet body 152 and a lower cabinet body 154, which can be used independently and can be coupled in one piece by elements such as screws. The upper cabinet body 152 is disposed above the lower cabinet body 154. Referring to FIG. 12B, an explosion diagram of a cabinet 150 according to another embodiment of the invention is shown. The cabinet 150 includes an upper cabinet body 152 and a lower cabinet body 154, which can be coupled together. The four-sided upright frames of the upper cabinet body 152 and the lower cabinet body 154 can be separated from each other and coupled together to form a combined frame. The upper cabinet body 152 and the lower cabinet body 154 can be coupled together by locking corresponding upright frames of the upper cabinet body 152 and the lower cabinet body 154 by connecting brackets 153. In an embodiment of the invention, the lower cabinet body 154 can be used for placing the disc library 110, the disc transport device 120 and the disc drive tower 130; the upper cabinet body 152 can be used for storing other elements such as computer host, monitor, keyboard or other purposes.

Besides, the bottom of the cabinet 150 has a roller set 156 which makes the delivery and movement of the cabinet 150 easier.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc library storage system, comprising:
    a disc library configured to accommodate a plurality of discs;

a disc drive tower configured to accommodate a plurality of disc drives, wherein the disc drives are configured to read or write disc data;

a disc transport device configured to move the discs to the disc drive tower from the disc library and to the disc library from the disc drive tower; and a disc changing device configured to place a disc cartridge, wherein the disc cartridge comprises an outer casing and a disc tray, the disc tray is configured to accommodate at least one replacement disc, and the disc changing device has a pull-out state and a close state; the disc changing device of the disc library storage system includes an ejection structure, wherein a bottom of the disc tray has at least one elastic buckle structure, and a bottom of the outer casing has at least one buckle opening; when the disc tray is received in the outer casing, the elastic buckle structure is buckled in the buckle opening; when the elastic buckle structure is pushed upwards by the ejection structure and detached from the buckle opening, the disc tray is drawn from the outer casing by the disc changing device, wherein, when the disc changing device is in the close state, the disc tray of the disc cartridge is drawn from the outer casing, and the disc transport device unloads the replacement disc from the disc tray, wherein, when the disc changing device is in the pull-out state, the disc tray of the disc cartridge is received in the outer casing.

2. The disc library storage system according to claim 1, wherein the disc drive tower comprises a cabinet body in which the disc changing device is disposed.

3. The disc library storage system according to claim 1, wherein the disc changing device comprises a track seat, a moveable seat and a bearing seat, the track seat, the moveable seat and the bearing seat slide relatively to one another, and the bearing seat is configured to carry the disc cartridge.

4. The disc library storage system according to claim 3, wherein when the moveable seat is moved along the track seat in a pull-out direction, the moveable seat drive the bearing seat to move in the pull-out direction until the disc changing device is in the pull-out state; when the moveable seat is moved along the track seat in a close direction inverse to the pull-out direction, the moveable seat drive the bearing seat to move in the close direction until the disc changing device is in the close state.

5. The disc library storage system according to claim 3, wherein the bearing seat has at least one guide slot whose extending direction is parallel to extending direction of the track seat; the moveable seat has at least one pull hook structure disposed in the guide slot and move within the guide slot.

6. The disc library storage system according to claim 5, wherein the bearing seat has a pull-out positioning point and a close positioning point relative to movement of the track seat; when the bearing seat is in the pull-out positioning point, the bearing seat no longer moves relative to the track seat in a pull-out direction; when the bearing seat is in the close positioning point, the bearing seat no longer moves relative to the track seat in the pull-out direction; when the bearing seat is in the pull-out positioning point or the close positioning point, the moveable seat is moveable relative to the bearing seat within a length range of the guide slot.

7. The disc library storage system according to claim 5, wherein the disc tray has at least one pull hook groove; when the disc cartridge is placed on the bearing seat, the pull hook structure of the moveable seat is engaged with the pull hook groove of the disc tray; when the moveable seat moves relative to the bearing seat, the pull hook structure moves in the guide slot and drives the disc tray to be drawn from or received in the outer casing through the pull hook groove.

8. The disc library storage system according to claim 3, wherein the ejection structure is disposed on the bearing seat; when the disc cartridge is placed on the bearing seat, the ejection structure pushes the elastic buckle structure upwards through the buckle opening.

9. The disc library storage system according to claim 1, wherein the disc cartridge is configured to be placed on a bearing seat of the disc changing device including at least one limiting structure, the outer casing includes at least one limiting groove, and the limiting structure of the bearing seat is located within the limiting groove of the outer casing.

10. A disc cartridge used in a disc library storage system, comprising:

an outer casing having an opening, wherein a bottom of the outer casing has at least one buckle opening; and a disc tray received in the outer casing, wherein the disc tray is drawn from the outer casing via the opening, a bottom of the disc tray has at least one elastic buckle structure; when the disc tray is received in the outer casing, the elastic buckle structure is buckled in the buckle opening, wherein, the disc cartridge is configured to be used in a disc changing device of the disc library storage system including an ejection structure, when the elastic buckle structure is pushed upwards by the ejection structure and detached from the buckle opening, the disc tray is drawn from the opening of the outer casing by the disc changing device.

11. The disc cartridge according to claim 10, wherein the disc tray has a front panel having a concave curved surface, the disc tray has a convex curved surface opposite to the concave curved surface, and the opening of the outer casing has a concave front edge; when the disc tray is drawn from the outer casing, the convex curved surface is aligned with the concave front edge.

12. The disc cartridge according to claim 10, wherein a rear bottom of a inner surface of the outer casing has a rising structure having a top surface and a bevel; when the disc tray moves into the outer casing and touches the rising structure, the bevel causes the disc tray to move upwards and the disc tray leans on the top surface.

13. The disc cartridge according to claim 10, wherein the disc tray has at least one pull hook groove; the disc changing device of the disc library storage system including a pull hook structure, the pull hook structure of the disc changing device is engaged with the pull hook groove of the disc tray, and the pull hook structure drives the disc tray to be drawn from or to be received in the outer casing through the pull hook groove.

14. The disc cartridge according to claim 10, wherein the disc cartridge is configured to be placed on a bearing seat of the disc changing device including at least one limiting structure, the outer casing includes at least one limiting groove, and the limiting structure of the bearing seat is located within the limiting groove of the outer casing.

* * * * *